United States Patent [19]

Mathison

[11] Patent Number: 4,994,685
[45] Date of Patent: Feb. 19, 1991

[54] REGULATED POWER SUPPLY AND METHOD

[75] Inventor: Leslie C. Mathison, Columbia, S.C.

[73] Assignee: NCR Corporation, Dayton, Ohio

[21] Appl. No.: 371,564

[22] Filed: Jun. 26, 1989

[51] Int. Cl.⁵ .......................... H02J 9/06; G05F 1/46; G05F 1/56

[52] U.S. Cl. ...................................... 307/66; 307/48; 323/249; 323/254; 323/273; 323/281

[58] Field of Search ................... 307/66, 401, 419, 46, 307/48, 43–45, 85–87, 418, 416; 323/247–261, 222–226, 273, 274, 281, 282

[56] References Cited

U.S. PATENT DOCUMENTS

| | | | |
|---|---|---|---|
| 4,065,676 | 12/1977 | Elias | 307/66 |
| 4,225,792 | 9/1980 | Fahey | 307/66 |
| 4,343,034 | 8/1982 | Wells et al. | 363/82 |
| 4,354,118 | 10/1982 | Spencer | 307/66 |
| 4,389,581 | 6/1983 | Iwasaki | 307/419 |
| 4,460,955 | 7/1984 | Hattori et al. | 363/91 |
| 4,488,057 | 12/1984 | Clarke | 307/66 |
| 4,510,400 | 4/1985 | Kiteley | 307/66 |
| 4,551,670 | 11/1985 | Anders et al. | 323/281 |
| 4,760,322 | 7/1988 | Crampton | 320/14 |
| 4,849,874 | 7/1989 | Buck et al. | 363/91 |

Primary Examiner—A. D. Pellinen
Assistant Examiner—David Osborn
Attorney, Agent, or Firm—Wilbert Hawk, Jr.; Stephen F. Jewett; Douglas S. Foote

[57] ABSTRACT

The subject invention is a power supply comprising a magnetic amplifier, filter, back-up battery, switch-over regulating circuit and error amplifier. The magnetic amplifier receives a plurality of AC pulses and controls the pulse width of the pulses. The filter converts the pulses to a DC output. The switch-over regulating circuit connects the battery to the DC output. The error amplifier monitors the DC output and provides, at its output, an error signal to the magnetic amplifier and the switch-over regulating circuit.

28 Claims, 2 Drawing Sheets

REGULATED POWER SUPPLY AND METHOD

The present invention relates to a switch mode power supply having a back-up battery. More particularly, it relates to method and power supply for regulating the output voltage from the power supply and battery with a common error amplifier.

BACKGROUND OF THE INVENTION

Most electronic and computer systems require DC voltage for their operation. A typical power supply for such systems converts AC line current to a regulated DC voltage. A "switch mode" type power supply first converts AC to an unregulated DC which is then controllably pulsed to a regulated DC output. For example, conversion of AC to an unregulated DC may be achieved by rectifying the AC and storing the non-regulated DC voltage in bulk capacitors. Current from the bulk capacitors is then periodically switched or pulsed across a primary winding of a transformer. The pulsating DC waveform is received by a secondary winding of the transformer, rectified, regulated, and stored in capacitors which provide the primary DC output voltage of the power supply.

"Regulation" of the DC output voltage refers to limiting changes or swings in the output voltage level. This is particularly important in many applications where small deviations from the design voltage level can affect the operation of the equipment being supported by such power supply. A voltage regulator which has been used successfully with switch mode power supplies has an error amplifier and magnetic amplifier (mag amp). The error amplifier monitors or tracks the output current and provides an error signal when the output deviates from the design voltage level. A mag amp uses one or more saturable reactors either alone or in combination with other components to control power gain. A saturable reactor is a coil with a magnetic core whose reactance may be controlled by applying a magnetic biasing current to control the blocking capability of the core. Typically, the magnetic biasing current is provided to the mag amp through a transistor which is controlled by the error signal. As the blocking capability of the core changes, the pulse width of current pulses passing therethrough will be changed.

For example, an increase in the output voltage increases the error signal from the error amplifier. The error signal holds the transistor on, increasing the magnetic biasing current to the saturable reactor. This increases the blocking capability of the saturable reactor which decreases the pulse width of the voltage pulse passing therethrough. Decreases in the pulse width lower the output voltage.

The reliability of switch mode power supplies is high. However, in the event of loss of AC power it is desirable to have a back-up battery which can be used to supply the required DC voltage. At a minimum this provides adequate time for the supported system to shut down. If the back-up battery has sufficient reserve, it may even provide enough power for continued operation of the system until AC power is restored. Such back-up batteries generally provide an unregulated output. For systems which provide a regulated output, a linear voltage regulator is employed. The use of two voltage regulators with separate error amplifiers, a mag amp post regulator for AC and a linear series pass regulator for DC operation, results in slight differences in the output voltage between the two modes of operation. Furthermore, linear voltage regulators used with the battery have some associated inefficiencies which result in excessive power dissipation or losses. Such losses can reduce the amount of time the back-up battery can maintain or hold up the output voltage.

OBJECTS OF THE INVENTION

It is therefore an object of the present invention to provide a new and improved switch mode power supply and back-up battery regulator for providing a regulated DC output.

It is another object of the present invention to provide a new and improved method for regulating the output voltage of a switch mode power supply with back-up battery.

It is a further object of the present invention to provide a power supply with magnetic amplifier and back-up battery regulator and having a common error amplifier for DC output voltage regulation.

It is yet a further object of the present invention to provide a switch mode power supply and back-up battery regulator with a reduced number of components.

SUMMARY OF THE INVENTION

One form of the present invention is a power supply comprising a magnetic amplifier, rectifier and filter, back-up battery, switch-over regulating circuit and error amplifier. The magnetic amplifier receives a plurality of AC pulses and controls the pulse width of the pulses. The filter converts the pulses to a DC output. The switch-over regulating circuit connects the battery to the DC output. The error amplifier monitors the DC output and provides, at its output, an error signal to both the magnetic amplifier and the switch-over regulating circuit.

Another form of the present invention is a method of regulating the output voltage of a switch mode power supply having a DC output and a back-up battery connected to the output by a switch-over regulating circuit. The method comprises providing a plurality of AC pulses to a magnetic amplifier and controlling the pulse width of the pulses passing through the magnetic amplifier. The pulses are filtered to provide a DC output voltage. An error signal is generated as a function of the DC output voltage and is provided to both the magnetic amplifier and switch-over regulating circuit. The output voltage is maintained by controlling the pulse width of the pulses or by connecting the battery to the output through the switch-over regulating circuit.

DESCRIPTION OF A PREFERRED EMBODIMENT

Figure 1A:
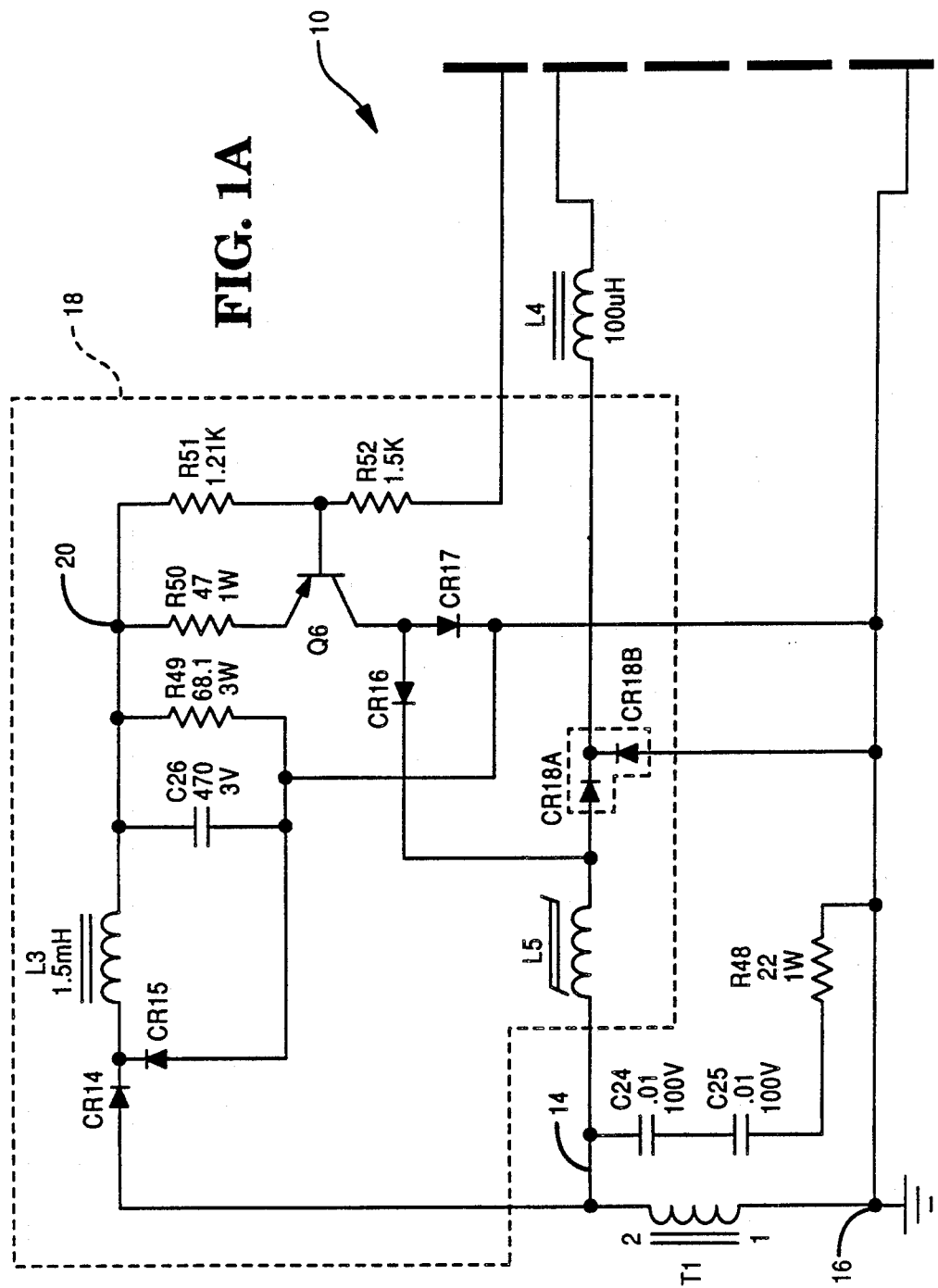
FIGS. 1A and 1B show a power supply according to one form of the present invention.
Figure 1B:
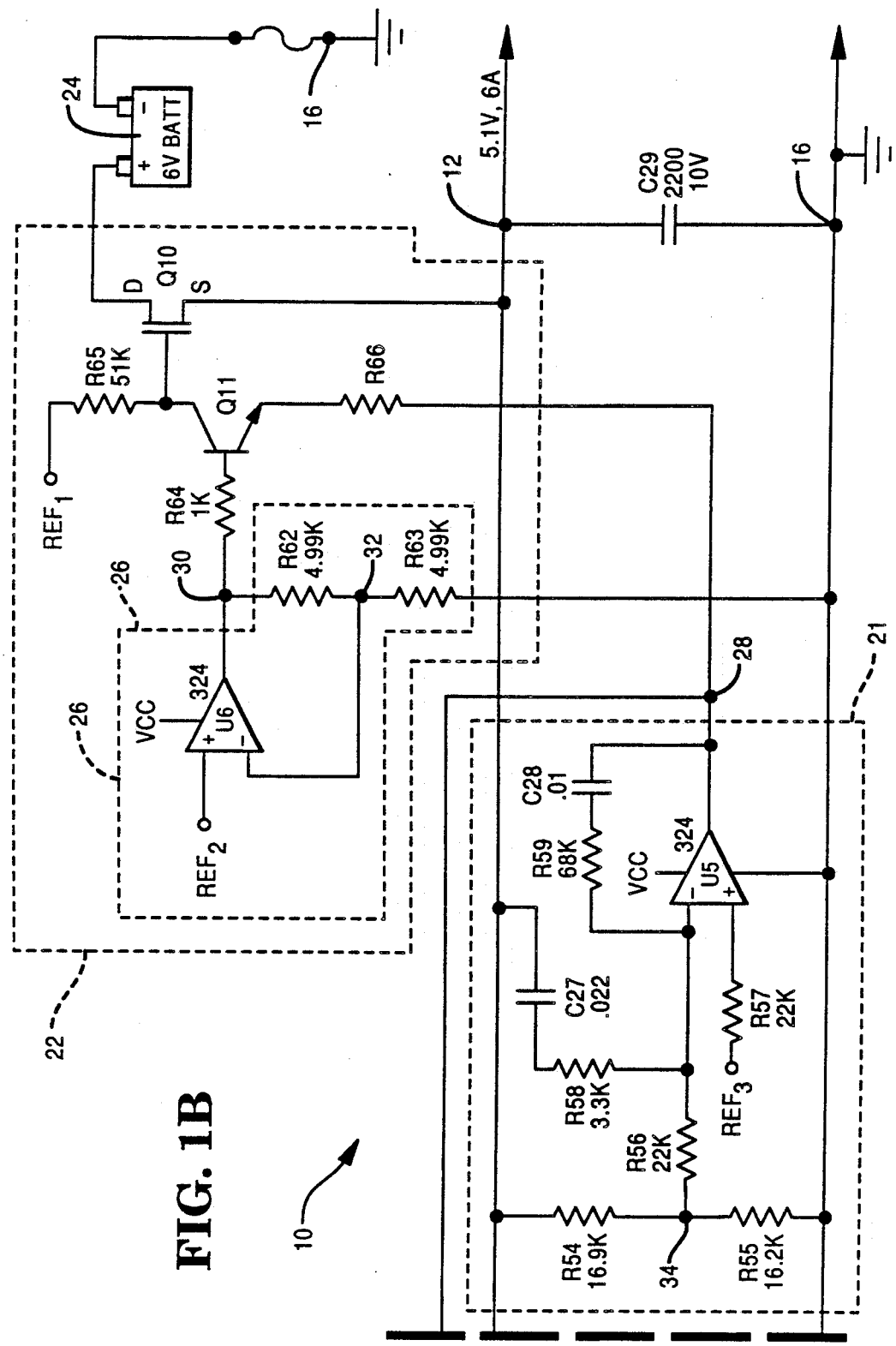

FIGS. 1A and 1B show a power supply 10 for supplying a regulated DC output voltage to an output voltage terminal 12 (FIG. 1B). Referring to FIG. 1A, circuit 10 includes a secondary transformer winding T1 for receiving a plurality of AC input voltage pulses. Winding T1 is connected between an input voltage line 14 and a first reference potential terminal 16 which in a preferred embodiment is ground. Circuit 10 is part of a switch mode power supply. The portion of the power supply not shown in the drawings receives AC line current which is converted to an unregulated DC voltage and stored on bulk capacitors. A switching circuit periodically pulses the DC voltage across a primary transformer winding to provide the AC input voltage pulses referred to above. The square wave so generated is received by secondary transformer winding T1. For an example of a switch mode power supply which provides AC pulses, see copending U.S. Patent Application Ser. No. 319,601, now U.S. Pat. No. 4,928,218 issued May 22, 1990, hereby incorporated by reference.

Power supply 10 includes a magnetic amplifier 18 which receives the plurality of pulses from winding T1 on input voltage line 14. Magnetic amplifier 18 includes a saturable reactor L5, a magnetic biasing voltage terminal 20 and a transistor Q6 connecting terminal 20 to saturable reactor L5. A magnetic biasing voltage is provided to terminal 20 by the input voltage pulses. Diodes CR14 and CR15 rectify the voltage pulses and inductor L3 and capacitor C26 filter the pulses to provide the biasing voltage on terminal 20.

Power supply 10 also includes a rectifier and a filter for converting the input pulses to a DC output voltage at terminal 12. The rectifier includes diodes CR18A and CR18B. The anode of diode CR18A is connected to saturable reactor L5, the anode of diode CR18B is connected to reference potential terminal 16, and their cathodes are connected together. The filter includes inductor L4 connected between the cathode of diode CR18A and terminal 12. Referring to FIG. 1B, the filter further includes a capacitor C29 connected across the output between terminals 12 and 16.

Power supply 10 further includes an error amplifier 21, and a switch-over regulating circuit 22 for connecting a back-up battery 24 to terminal 12. Switch-over regulating circuit 22 includes transistors Q10 and Q11, resistors R64, R65 and R66, and a precision reference voltage supply circuit 26. Back-up battery 24 is connected between terminal 16 and the drain of transistor Q10. In a preferred embodiment, transistor Q10 is a power MOSFET. The source of transistor Q10 is connected to terminal 12 thereby connecting battery 24 to the DC output. Transistor Q11 is connected between the control electrode or gate of transistor Q10 and the output 28 of error amplifier 21. In a preferred embodiment, resistor R66 is connected between the emitter of transistor Q11 and output 28. The gate of transistor Q10 is connected to a reference potential terminal $REF_1$. In a preferred embodiment, resistor R65 is connected between the gate of transistor Q10 and and $REF_1$. The control electrode or base of transistor Q11 is connected to a reference potential terminal 30 through a resistor R64. The reference voltage for terminal 30 is provided, in a preferred embodiment, by precision reference voltage supply circuit 26. Circuit 26 includes a differential amplifier U6 with + and − input terminals and an output connected to terminal 30. Resistors R62 and R63 are series connected between terminal 30 and reference terminal 16 and form a voltage divider. The common point 32 between resistors R62 and R63 provides a feedback voltage to the − input of differential amplifier U6. A reference potential terminal $REF_2$ is connected to the + input of differential amplifier U6. The output of differential amplifier U6 is connected to the base of transistor Q11 through resistor R64.

Error amplifier 21 includes a differential amplifier U5 having − and + inputs and an output 28. The + input of differential amplifier U5 is connected to a reference potential terminal $REF_3$ through a resistor R57. The − input of differential amplifier U5 is connected to a resistor R56. Resistor R56 is connected to the common point 34 between series connected resistors R54 and R55, resistors R54 and R55 being connected in parallel with the DC output between terminals 12 and 16. In this manner, the − input of differential amplifier U5 receives a signal which is proportional to the DC output. Output 28 of differential amplifier U5 is also connected to the control electrode or base of transistor Q6 through resistor R52 (See FIG. 1A).

In operation, when AC power is active, saturable reactor L5 receives a plurality of square wave pulses from the secondary winding of transformer T1. The pulses are rectified by CR18 and filtered by inductor L4 and capacitor C29 and provide a DC output voltage at terminal 12. In a preferred embodiment the output voltage will be about 5.1 volts. The output voltage is monitored by error amplifier 21. Resistors R54 and R55 divide the output voltage which is then provided, along with reference voltage $REF_3$, to differential amplifier U5. In a preferred embodiment, $REF_3$ is about 2.5 volts. Differential amplifier U5 generates an error signal which is a function of the output voltage. This error signal is then provided to both magnetic amplifier 18 and switch-over regulating circuit 22.

The error signal received by magnetic amplifier 18 is provided to the base of transistor Q6. As the error signal changes, the base current of transistor Q6 will change thereby affecting the magnetic biasing current received by saturable reactor L5 from terminal 20. By changing the magnetic biasing current on reactor L5 the pulse width of pulse passing therethrough will be controlled. For example, if the output voltage starts to fall, the error signal will increase because the output voltage is reflected on the − input of differential amplifier U5. This will decrease the base current of PNP transistor Q6. As the conductance of transistor Q6 decreases, the magnetic biasing voltage received by saturable reactor L5 will decrease, which will increase the pulse width of pulses passing through saturable reactor L5. This will increase the output voltage.

As noted above, the error signal from differential amplifier U5 is also provided to switch-over regulating circuit 22. More specifically, the error signal is provided to the emitter of NPN transistor Q11 through resistor R66. In a preferred embodiment, $REF_1$ is about 14 volts, $REF_2$ is about 2.5 volts and the voltage at the base of Q11 is about 5 volts. As long as the emitter voltage is below about 4.5 volts, transistor Q11 will be on and the collector voltage (gate voltage of transistor Q10) will be pulled low enough to keep transistor Q10 off. As the output voltage starts to drop, magnetic amplifier 18 will attempt to bring it up by increasing the pulse width. However, if the power supply has lost AC power, the output voltage will continue to drop. This will increase the error voltage thereby raising the emitter voltage on transistor Q11 and gradually decreasing its conductance. This will cause an increase in the collector voltage of transistor Q11 (which is also the gate of transistor Q10) which will turn on MOSFET Q10. Back-up battery 24 will now be connected to output terminal 12 and provide the required voltage. Error amplifier 21 will continue to monitor and regulate the output voltage by varying the conductance of Q11 and MOSFET Q10. By selectively sizing the components of magnetic amplifier 18 and switch-over regulating circuit 22, a threshold value for the error voltage may be established. For an error voltage below the threshold value, the pulse widths of magnetic amplifier 18 are varied to maintain the output voltage. For an error voltage above the threshold value, switch-over regulating circuit 22 connects battery 24 to output voltage terminal 12 and regulates the output voltage.

It will be clear to those skilled in the art that the present invention is not limited to the specific embodiment disclosed and illustrated herein. Nor is the invention limited to the specific component values and specified voltage and current levels. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A power supply comprising:
    a magnetic amplifier for receiving a plurality of AC pulses and for controlling the pulse width of said pulses;
    a rectifier and filter for converting said pulses to a DC output;
    a back-up battery;
    a switch-over regulating circuit connecting said battery to said DC output; and
    an error amplifier for monitoring said DC output and providing, at its output, an error signal to said magnetic amplifier and said switch-over regulating circuit.

2. The power supply of claim 1 wherein said switch-over regulating circuit includes a first transistor connecting said battery to said DC output.

3. The power supply of claim 2 wherein said first transistor is a power MOSFET.

4. The power supply of claim 2 wherein said switch-over regulating circuit further includes a second transistor connected between the control electrode of said first transistor and said output of said error amplifier.

5. The power supply of claim 4 wherein said switch-over regulating circuit includes a resistor connected between said second transistor and said output of said error amplifier.

6. The power supply of claim 4 wherein said control electrode of said first transistor is connected to a first reference potential terminal.

7. The power supply of claim 6 wherein said switch-over regulating circuit includes a resistor connected between the control electrode of said first transistor and said first reference potential terminal.

8. The power supply of claim 6 wherein the control electrode of said second transistor is connected to a second reference potential terminal.

9. The power supply of claim 8 wherein said switch-over regulating circuit further includes a precision reference voltage supply circuit for providing said second reference potential voltage, said supply circuit having:
    a first differential amplifier for receiving a third reference voltage and a feedback voltage; and
    first and second resistors series connected between the output of said differential amplifier and a fourth reference potential terminal;
    wherein the common point between said first and second resistors is connected to an input of said differential amplifier for providing said feedback voltage; and
    wherein said output of said differential amplifier is connected to the control electrode of said second transistor.

10. The power supply of claim 8 wherein said switch-over regulating circuit includes a third resistor connected between the output of said differential amplifier and control electrode of said second transistor.

11. The power supply of claim 1 wherein said error amplifier includes a second differential amplifier having a first input connected to a fifth reference potential terminal and a second input for receiving a signal proportional to said DC output.

12. The power supply of claim 11 wherein said error amplifier further includes fourth, fifth and sixth resistors, said fourth and fifth resistors being series connected in parallel with said DC output, and said sixth resistor being connected between the common point of said fourth and fifth resistors and said second input of said second differential amplifier.

13. The power supply of claim 1 wherein said magnetic amplifier includes a saturable reactor for receiving said AC pulses and a third transistor for connecting a magnetic biasing voltage to said saturable reactor.

14. The power supply of claim 13 wherein the control electrode of said third transistor is connected to said output of said error amplifier.

15. A power supply comprising:
    a magnetic amplifier for receiving a plurality of AC pulses and for controlling the pulse width of said pulses;
    a filter for converting said pulses to a DC output;
    a back-up battery;
    a switch-over regulating circuit connecting said battery to said DC output; and
    an error amplifier for monitoring said DC output and providing, at its output, an error signal to said magnetic amplifier and said switch-over regulating circuit;
    wherein said switch-over regulating circuit includes a power MOSFET transistor for connecting said battery to said DC output and regulating the voltage of that output, and a second transistor connected between the control electrode of said MOSFET and said output of said error amplifier, said control electrode of said MOSFET being connected to a first reference potential terminal, and the control electrode of said second transistor being connected to a second reference potential terminal; and
    wherein said magnetic amplifier includes a saturable reactor for receiving said AC pulses and a third transistor for connecting a magnetic biasing voltage to said saturable reactor, the control electrode of said third transistor being connected to said output of said error amplifier.

16. The power supply of claim 15 wherein said switch-over regulating circuit further includes a precision reference voltage supply circuit for providing said second reference potential voltage, said supply circuit having:
    a first differential amplifier for receiving a third reference voltage and a feedback voltage; and
    first and second resistors series connected between the output of said differential amplifier and a fourth reference potential terminal;
    wherein the common point between said first and second resistors is connected to an input of said differential amplifier for providing said feedback voltage; and wherein said output of said differential amplifier is connected to the control electrode of said second transistor.

17. The power supply of claim 16 wherein said switch-over regulating circuit includes a third resistor connected between the output of said differential amplifier and control electrode of said second transistor.

18. The power supply of claim 17 wherein said error amplifier includes a second differential amplifier having a first input connected to a fifth reference potential terminal and a second input for receiving a signal proportional to said DC output.

19. The power supply of claim 18 wherein said error amplifier further includes fourth, fifth and sixth resistors, said fourth and fifth resistors being series connected in parallel with said DC output, and said sixth resistor being connected between the common point of said fourth and fifth resistors and said second input of said second differential amplifier.

20. The power supply of claim 19 wherein said switch-over regulating circuit includes a seventh resistor connected between said second transistor and said output of said error amplifier and an eighth resistor connected between the control electrode of said first transistor and said first reference potential terminal.

21. For a switch mode power supply having a DC output and a back-up battery connected to the output by a switch-over regulating circuit, a method of regulating the output voltage comprising:
providing a plurality of AC pulses to a magnetic amplifier;
controlling the pulse width of the pulses passing through said magnetic amplifier;
filtering said pulses to provide a DC output voltage;
generating an error signal as a function of said DC output voltage;
providing said error signal to said magnetic amplifier;
providing said error signal to said switch-over regulating circuit; and
maintaining said output voltage by controlling the pulse width of said pulses or by connecting said battery to said output through said switch-over regulating circuit.

22. The method of claim 21 wherein said generating step includes providing said output voltage and a reference voltage to the inputs of a differential amplifier, and wherein the output of said differential amplifier is said error signal.

23. The method of claim 21 wherein said magnetic amplifier includes a magnetic biasing voltage terminal and a saturable reactor for receiving said AC pulses, and wherein said controlling step includes providing said magnetic biasing voltage to said reactor.

24. The method of claim 23 wherein said magnetic amplifier includes a transistor connected between said magnetic biasing voltage terminal and said saturable reactor, and wherein said step of providing said error signal to said magnetic amplifier includes providing said signal to the control electrode of said transistor.

25. The method of claim 21 wherein said switch-over regulating circuit includes a MOSFET transistor connecting said battery to said DC output and further includes a second transistor connected between the control electrode of said MOSFET and a terminal for receiving said error voltage, and wherein said step of providing said error signal to said switch-over regulating circuit includes providing said error signal to said second transistor.

26. The method of claim 25 wherein said maintaining step includes establishing a threshold value for said error voltage, below which the pulse widths of said magnetic amplifier are varied to maintain said output voltage and above which said battery is connected to said output and regulated to maintain said output voltage.

27. For a switch mode power supply having a DC output and a back-up battery connected to the output by a switch-over regulating circuit, said switch-over regulating circuit including a MOSFET transistor connecting said battery to said DC output and including a second transistor connected between the control electrode of said MOSFET and a terminal for receiving a control signal, a method of regulating the output voltage comprising:
providing a plurality of AC pulses to a magnetic amplifier, wherein said magnetic amplifier includes a magnetic biasing voltage terminal, a saturable reactor, and a third transistor connected between said terminal and reactor for receiving said AC pulses;
controlling the pulse width of the pulses passing through said magnetic amplifier by providing said magnetic biasing voltage to said reactor;
filtering said pulses to provide a DC output voltage;
providing said output voltage and a reference voltage to the inputs of a differential amplifier to generate an error signal;
providing said error signal to the control electrode of said third transistor;
providing said error signal to said second transistor; and
maintaining said output voltage by controlling the pulse width of said pulses, or by connecting said battery to said output and regulating battery voltage through said MOSFET transistor.

28. The method of claim 27 wherein said maintaining step includes establishing a threshold value for said error voltage, below which the pulse widths of said magnetic amplifier are varied to maintain said output voltage and above which said battery is connected to said output and regulated to maintain said output voltage.

* * * * *